(12) United States Patent
Grimm et al.

(10) Patent No.: US 9,074,661 B2
(45) Date of Patent: Jul. 7, 2015

(54) DRIVE UNIT WITH DRIVE MOTOR AND PLANETARY GEAR MECHANISM

(71) Applicant: Robert Bosch GmbH, Stuttgart (DE)

(72) Inventors: Raimund Grimm, Iserlohn (DE); Markus Magiera, Gevelsberg (DE); Mario Reimann, Wetter (DE)

(73) Assignee: Robert Bosch GmbH, Stuttgart, DE (US)

( * ) Notice: Subject to any disclaimer, the term of this patent is extended or adjusted under 35 U.S.C. 154(b) by 0 days.

(21) Appl. No.: 14/478,490

(22) Filed: Sep. 5, 2014

(65) Prior Publication Data

US 2015/0072821 A1 Mar. 12, 2015

(30) Foreign Application Priority Data

Sep. 12, 2013 (DE) .................. 10 2013 218 243
Dec. 12, 2013 (DE) .................. 10 2013 225 693

(51) Int. Cl.
*F16H 1/46* (2006.01)
*H02K 7/116* (2006.01)

(52) U.S. Cl.
CPC . *F16H 1/46* (2013.01); *H02K 7/116* (2013.01)

(58) Field of Classification Search
USPC ............ 475/31, 207, 220, 330, 337, 343, 149
See application file for complete search history.

(56) References Cited

U.S. PATENT DOCUMENTS

| 3,459,070 A | * | 8/1969 | Holdeman | 475/337 |
| 4,330,045 A | * | 5/1982 | Myers | 180/65.51 |
| 4,344,336 A | * | 8/1982 | Carriere | 475/48 |
| 2010/0197439 A1 | * | 8/2010 | Weber et al. | 475/83 |

FOREIGN PATENT DOCUMENTS

| DE | 102006051817 A1 | * | 5/2008 |
| EP | 1 761 718 B1 | | 3/2007 |
| GB | 2156475 A | * | 10/1985 |

\* cited by examiner

*Primary Examiner* — Justin Holmes
(74) *Attorney, Agent, or Firm* — Maginot, Moore & Beck LLP

(57) ABSTRACT

A drive unit with a planetary gear mechanism includes a stationary housing. A drive motor is eccentrically positioned on an end face of the stationary housing. A preliminary gear stage of the drive unit includes (i) an externally toothed spur gear shaft operatively connected to an output shaft of the drive motor, and (ii) an internally toothed gear that is operatively connected to the spur gear shaft, and that is coaxial with and is further operatively connected to a sun gear shaft. A hub housing is mounted on the stationary housing by at least two bearings, and has at least one integrated internal gear. At least two planetary stages are positioned downstream of the sun gear shaft, and are configured to transmit converted torque of the drive motor to the hub housing via the at least one integrated internal gear.

9 Claims, 2 Drawing Sheets

DRIVE UNIT WITH DRIVE MOTOR AND PLANETARY GEAR MECHANISM

This application claims priority under 35 U.S.C. §119 to patent application no. DE 10 2013 218 243.0, filed on Sep. 12, 2013 in Germany, and to patent application no. DE 10 2013 225 693.0, filed Dec. 12, 2013 in Germany, the disclosures of which are incorporated herein by reference in their entirety.

The disclosure relates to a drive unit with a planetary gear mechanism which is connected to a drive motor via an output shaft of said drive motor and, on the gear mechanism input side, has a sun gear shaft and at least two planetary stages which are connected downstream of it and transmit the converted torque of the drive motor to a hub housing with at least one integrated internal gear, the at least one internal gear being mounted via at least two bearings on a stationary housing, and a preliminary gear stage which is operatively connected on the drive side to the drive motor and is operatively connected on the output side to the sun gear shaft being mounted via at least one bearing in the housing.

BACKGROUND

The field of use of a drive unit of this type with a drive motor and a planetary gear mechanism extends principally to drive transmissions, winching gear mechanisms and swiveling gear mechanisms and to stationary gear units or else pitch and azimuth gear mechanisms for wind power plants.

As a rule, the planetary gear mechanism in drive transmissions and swiveling gear mechanisms is provided to step down the rotational speed of the drive motor. The at least two planetary stages of the planetary gear mechanism transmit the converted torque to a single-piece internal gear or a plurality of internal gears which are connected to one another and are integrated into a hub housing. The configuration of the planetary gear mechanism and of the internal gears which are integrated into the hub housing is to be adapted for the respectively required torque. The toothing systems of the internal gears are therefore produced individually by way of butt joining or reaming. The advantages of said drive unit lie, in particular, in the compactness of the arrangement. The disadvantage is to be seen in the wide variety of parts. The butt jointed or reamed toothing system of the internal gears changes depending on the transmission ratio and causes a completely new internal gear variant. The customer-specific differentiation already takes place at the blank part level at a very early time in the value chain. This leads firstly to high costs and, moreover, has a massive influence on the delivery capability, the delivery reliability and the logistics concept. A standardized planetary gear mechanism and a hub housing with a standardized internal gear represent a development of said drive unit.

A switchable hydrostatic compact drive is apparent from document EP 1 761 718 B1, with at least one planetary stage, in which a first switchable multiple disk clutch connects an internal gear fixedly to a housing so as to rotate with it, and in which a second switchable multiple disk clutch connects the sun gear of the planetary gears fixedly to the internal gear so as to rotate with it. The sun gear of the planetary stage is driven by a hydraulic motor and a planet spider of the planetary stage is provided as output. For use as a traction drive or winching drive, the stationary housing which is arranged on the outside is provided with a hub housing which serves as output and is arranged rotatably with respect to the former. The tapered roller bearing system which is arranged between the housing and the hub housing absorbs the forces which act on the gear mechanism from the outside. In the inner region of the housing, an annular disk carrier receives the inner disks of the first multiple disk clutch radially on the outside and, lying opposite them radially on the inside, the outer disks of the second multiple disk clutch and a spring store which is arranged axially next to them and acts on the disk carrier in the axial direction in order to close the second multiple disk clutch. When the second multiple disk clutch is closed, the axial force of the spring store is supported on one side on said disk carrier, the multiple disk assembly being supported in turn on the disk carrier, furthermore. At least one further planetary stage for stepping down the gear mechanism rotational speed is connected downstream of the planet spider of the planetary stage. The planetary stages which are connected downstream of the planet spider transmit the converted torque via in each case one internal gear to the hub housing.

In a first gear, the multiple disk assembly of the first multiple disk clutch is pressed together by way of a spring store. As a result, the internal gear with the disk carrier which is connected in a rotationally fixed manner is connected via a further disk carrier to the housing. The input rotational speed is transmitted by the sun gear via the planetary gear and the planet spider with a transmission ratio i>1 to the planetary gear mechanism. In a second gear, the step piston is loaded with pressure and releases the rotationally fixed connection of the disk carriers. The internal gear can rotate freely with respect to the housing. In this switching state, the planetary gear is blocked per se via the connection of the sun gear and the internal gear and forwards the input rotational speed with the transmission ratio i=1 to the planetary stage.

On account of the switchable preliminary gear stage, this configuration of the drive unit with a switchable preliminary gear stage permits a standardized planetary gear mechanism and hub housing. However, the switchable preliminary gear stage is of relatively complex configuration and comprises a large number of components, as a result of which it is relatively expensive to produce. In addition, the preliminary gear stage takes up installation space and increases the weight of the entire drive unit.

SUMMARY

It is therefore the object of the present disclosure to optimize a drive unit with a drive motor and a planetary gear mechanism in such a way that it is configured to be of compact overall design with a reduced weight, the advantage of a standardized planetary gear mechanism being retained.

The object is achieved proceeding from a drive unit according to the present disclosure. The drawings and the claims show advantageous developments of the disclosure.

According to the disclosure, the drive motor is arranged eccentrically on an end face of the housing, the output shaft of the drive motor being operatively connected on the output side to an externally toothed spur gear shaft of the preliminary gear stage which in turn is operatively connected on the output side to an internally toothed spur gear which is arranged coaxially with respect to the sun gear shaft. In other words, the preliminary gear stage comprises merely the externally toothed spur gear shaft and the internally toothed spur gear which interacts with it. The transmission ratio can be varied in the range greater than 1 via the toothing system of the spur gear shaft and of the spur gear. The converted torque is guided via the sun gear shaft into the planetary gear mechanism. The planetary gear mechanism and the at least one internal gear which is integrated into the hub housing can therefore be standardized on account of the preliminary gear stage. Furthermore, the preliminary gear stage permits compensation for the transmission ratio hole which is produced during the change from the two-stage to the three-stage planetary gear mechanism, without increasing the installation space.

According to one preferred exemplary embodiment, a brake unit is arranged in the housing, comprising a housing with outer disks which interact with inner disks which are arranged on the spur gear shaft, in order to brake the spur gear shaft. The brake unit is pre-assembled as a module in the housing and can be arranged directly on the housing of the drive unit axially between the drive motor and the preliminary gear stage. In order to brake the spur gear shaft, the multiple disk assembly, consisting of outer disks which are formed on the housing and inner disks which are formed in the spur gear shaft, is compressed. The frictional moment which is produced in this way brakes the spur gear shaft.

The internally toothed spur gear is preferably mounted via at least one anti-friction bearing in the housing. The anti-friction bearing is preferably a needle bearing. It is also conceivable that the internally toothed spur gear is mounted via at least one plain bearing in the housing. The anti-friction bearing or the plain bearing is preferably arranged radially between an outer circumferential face of the spur gear and an inner circumferential face of the housing at the level of the internal toothing system of the spur gear which meshes with the external toothing system of the spur gear shaft. The anti-friction bearing is arranged at the level of the engagement of the sun gear shaft on the outer circumferential face of the spur gear and bears against an inner circumferential face of the housing.

Furthermore, it is preferred that the internally toothed spur gear is mounted via two anti-friction bearings in an O-arrangement in the housing. In this case, the arrangement of a needle bearing or a plain bearing might be dispensed with, with the result that the spur gear is mounted only via the two anti-friction bearings.

The disclosure includes the technical teaching that the drive motor is operated hydraulically or electrically.

According to one preferred exemplary embodiment, a drive element is arranged between the internally toothed spur gear and the sun gear shaft. The drive element can be arranged both radially and axially between the internally toothed spur gear and a sun gear shaft. The geometry of the spur gear can be simplified as a result.

The at least one internal gear which is integrated into the hub housing is preferably reamed continuously. In comparison with the butt joining process, the reaming process affords the advantage of a greatly shortened production time. The reaming tool is namely pulled through the hub housing within a few seconds, as a result of which the toothing system of the internal gear is produced.

BRIEF DESCRIPTION OF THE DRAWINGS

Further measures which improve the disclosure will be shown in greater detail in the following text together with the description of preferred exemplary embodiments of the disclosure using the figures, in which.

DETAILED DESCRIPTION

Figure 1:
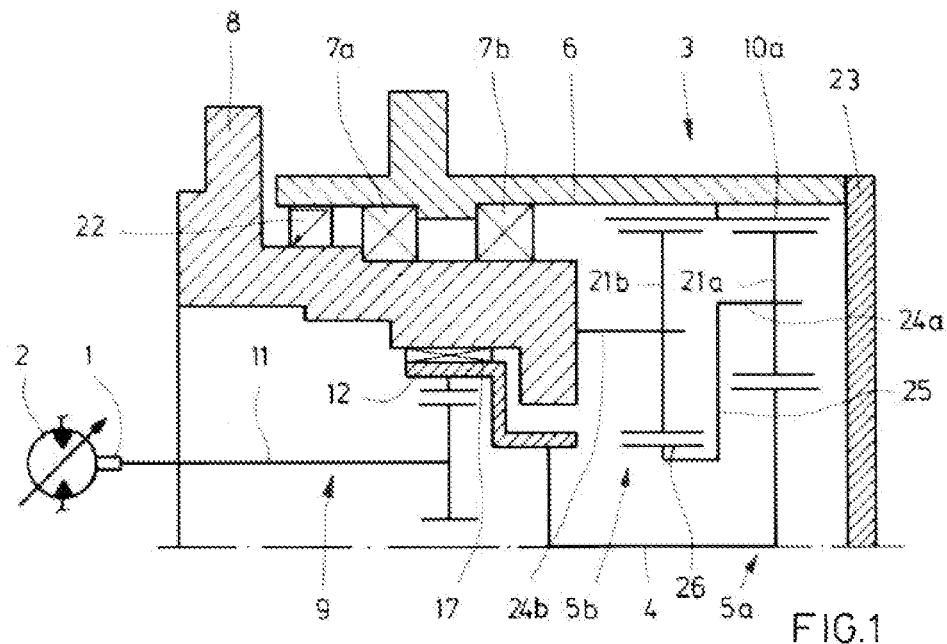
FIG. 1 shows a diagrammatic longitudinal sectional illustration of the drive unit according to the disclosure according to a first exemplary embodiment.

According to FIG. 1, the drive unit has a hydraulic drive motor 2, from which an output shaft 1 emanates in the direction of the planetary gear mechanism 3. The output shaft 1 of the drive motor 2 is operatively connected to a spur gear shaft 11. The spur gear shaft 11 is externally toothed on the output side and meshes with an internally toothed spur gear 12. The spur gear shaft 11 and the spur gear 12 together form the preliminary gear stage 9. The planetary gear mechanism 3 is connected downstream of the gear stage 9, which planetary gear mechanism 3 has, on the gear mechanism input side, a sun gear shaft 4 and two planetary stages 5a, 5b which are connected downstream of it. The sun gear shaft 4 is operatively connected on the drive side to the spur gear 12 and on the output side to the first planetary stage 5a. The first planetary stage 5a has at least three planets 21a, of which only one planet 21a can be seen here. The planets 21a are connected fixedly to the planet spider 25 via planet journals 24a and rotate between the sun gear shaft 4 and an internal gear 10a. The planet spider 25 is operatively connected to the sun gear, as a result of which the main part of the torque is transmitted to the second planetary stage 5b.

The second planetary stage 5b has at least three planets 21b, of which only one planet 21b can be seen here. The planets 21b are connected fixedly to the housing 8 via planet journals 24b and transmit a main part of the torque to the internal gear 10a. The internal gear 10a is integrated into a hub housing 6, the hub housing 6 accommodating a drive unit (not shown here) of the machine. The drive unit can be, for example, a chain or wheel. Furthermore, the hub housing 6 is mounted via two bearings 7a, 7b on the stationary housing 8. In order to seal the planetary gear mechanism 3, a seal element 22 is situated radially between the hub housing 6 and the housing 8. The hub housing 6 is closed on the end side by way of a cover 23. The spur gear 12 is arranged coaxially with respect to the sun gear shaft 4 and is mounted via the needle bearing 17 in the housing 8.

Figure 2:
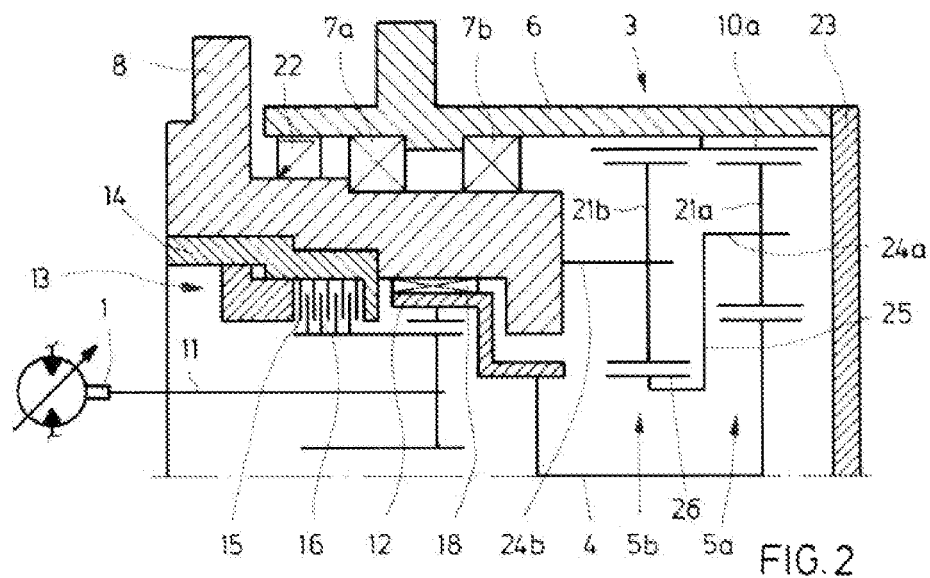
FIG. 2 shows a diagrammatic longitudinal sectional illustration of the drive unit according to the disclosure according to a second exemplary embodiment.

According to FIG. 2, the spur gear 12 is mounted via a plain bearing 18 in the housing 8. Furthermore, a brake unit 13 is arranged in the housing 8, comprising a housing 14 with outer disks 15. The spur gear shaft 11 has a web with inner disks 16 which interact with the outer disks 15 in the housing 14 of the brake unit 13, in order to brake the spur gear shaft 11. For braking, the multiple disk assembly is compressed, as a result of which a friction moment is generated between the outer disks 15 and the inner disks 16.

Figure 3:
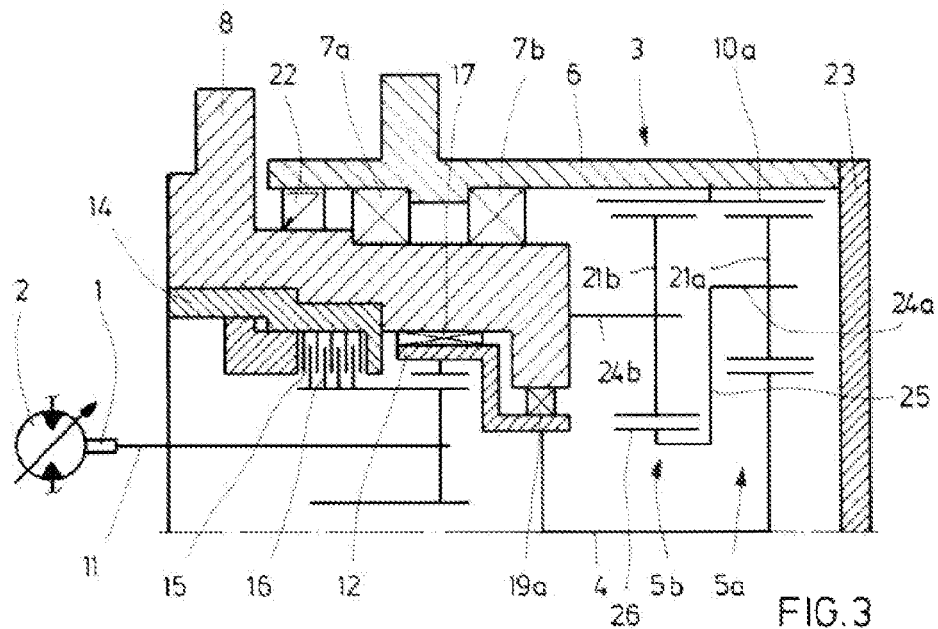
FIG. 3 shows a diagrammatic longitudinal sectional illustration of the drive unit according to the disclosure according to a third exemplary embodiment.

According to FIG. 3, the spur gear 12 is mounted via a needle bearing 17 and an anti-friction bearing 19a in the housing 8.

Figure 4:
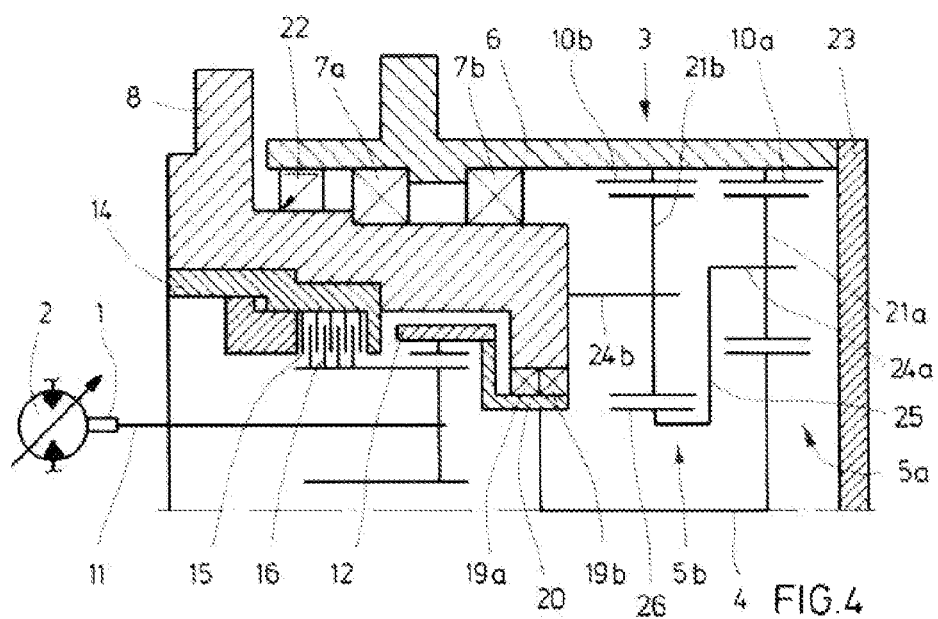
FIG. 4 shows a diagrammatic longitudinal sectional illustration of the drive unit according to the disclosure according to a fourth exemplary embodiment.

According to FIG. 4, a drive element 20 is arranged between the spur gear 12 and the sun gear shaft 4. The drive element 20 simplifies the configuration of the spur gear 12. Furthermore, the drive element 20 is mounted via two anti-friction bearings 19a, 19b in the housing 8. The anti-friction bearings 19a, 19b have an O-arrangement. The hub housing 6 has two internal gears 10a, 10b which are integrated into it, the internal gear 10a being operatively connected to the planetary stage 5a and the internal gear 10b being operatively connected to the planetary stage 5b. The internal gears 10a, 10b are reamed continuously. Furthermore, the drive unit has an electric drive motor 2.

The disclosure is not restricted to the above-described preferred exemplary embodiments. Rather, modifications herefrom are also conceivable which are also included in the scope of protection of the following claims. It is thus also possible, for example, to also arrange a three-stage or multiple-stage planetary gear mechanism 3 instead of a two-stage planetary gear mechanism 3. Furthermore, depending on the application, the respective planetary stages 5a, 5b can also have four or more planets 21a, 21b.

In addition, it is to be noted that "comprising" does not rule out any other elements or steps and "a" or "one" does not rule out a multiplicity. Furthermore, it is to be noted that features or steps which have been described with reference to one of the above exemplary embodiments can also be used in combination with other features or steps of other above-described exemplary embodiments.

LIST OF REFERENCE NUMERALS

1 Output shaft
2 Drive motor
3 Planetary gear mechanism
4 Sun gear shaft
5a, 5b Planetary stage
6 Hub housing
7a, 7b Bearing
8 Housing
9 Preliminary gear stage
10, 10b Internal gear
11 Spur gear shaft
12 Spur gear
13 Brake unit
14 Housing
15 Outer disks
16 Inner disks
17 Needle bearing
18 Plain bearing
19a, 19b Anti-friction bearing
20 Driver element
21a, 21b Planet
22 Seal element
23 Cover
24a, 24b Planet journal
25 Planet spider
26 Sun gear

What is claimed is:

1. A drive unit with a planetary gear mechanism, comprising:
   a stationary housing;
   a sun gear shaft;
   a drive motor positioned on an end face of the stationary housing eccentrically with respect to the stationary housing and the sun gear shaft;
   a preliminary gear stage mounted by at least one first bearing in the stationary housing and including:
      an externally toothed spur gear shaft having:
         a drive side operatively connected to an output shaft of the drive motor; and
         an output side; and
      an internally toothed gear connected to and meshing with the output side of the externally toothed spur gear shaft, wherein the internally toothed gear is positioned coaxially with and is operatively connected to the sun gear shaft;
   a hub housing mounted on the stationary housing by at least two second bearings and including at least one integrated internal gear; and
   at least two planetary stages connected downstream of the sun gear shaft and that are configured to transmit converted torque of the drive motor to the hub housing via the at least one integrated internal gear.

2. The drive unit according to claim 1, further comprising:
   inner disks positioned on the externally toothed spur gear shaft; and
   a brake unit that is positioned in the stationary housing and that includes a housing having outer disks that are configured to interact with the inner disks to brake the externally toothed spur gear shaft.

3. The drive unit according to claim 1, wherein the internally toothed gear is mounted in the stationary housing via the at least one first bearing, which includes at least one anti-friction bearing.

4. The drive unit according to claim 3, wherein the internally toothed gear is mounted in the stationary housing via the at least one first bearing, which includes at least one needle bearing.

5. The drive unit according to claim 3, wherein the internally toothed gear is mounted in the stationary housing via the at least one first bearing, which includes at least two anti-friction bearings in an O-arrangement.

6. The drive unit according to claim 1, wherein the internally toothed gear is mounted in the stationary housing via the at least one first bearing, which includes at least one plain bearing.

7. The drive unit according to claim 1, wherein the drive motor is either:
   (i) a hydraulically operated motor; or
   (ii) an electrically operated motor.

8. The drive unit according to claim 1, further comprising a drive element positioned between the internally toothed gear and the sun gear shaft.

9. The drive unit according to claim 8, wherein the drive element is mounted in the stationary housing via the at least one first bearing, which includes at least one anti-friction bearing.

* * * * *